United States Patent [19]

Park et al.

[11] Patent Number: 5,693,358
[45] Date of Patent: Dec. 2, 1997

[54] ANIMAL FEED MANUFACTURING METHOD BASED ON FISH OIL

[76] Inventors: Soo Kil Park, 225-141, Eungam-dong, Eunpyeung-ku, Seoul; Sang Hak Lee, 323-10, Mochen-ri, Seonggu-up, Cheonan-si, Chungcheongnam-do, both of Rep. of Korea

[21] Appl. No.: 545,873

[22] Filed: Oct. 20, 1995

[51] Int. Cl.$^6$ ................ A23K 1/10; A23D 7/04; C11B 3/00

[52] U.S. Cl. ............ 426/643; 426/2; 426/330.6; 426/413; 426/488; 426/33; 426/601

[58] Field of Search .............. 426/2, 643, 330.6, 426/413, 488, 33, 601

[56] References Cited

U.S. PATENT DOCUMENTS

| | | |
|---|---|---|
| 1,638,700 | 8/1927 | Molofsky . |
| 3,907,870 | 9/1975 | Kozuka et al. . |
| 5,012,761 | 5/1991 | Oh ................................. 426/2 |

FOREIGN PATENT DOCUMENTS 9300779  2/1993  Rep. of Korea .

OTHER PUBLICATIONS

Lee Derwent Abstract C93-144378.

*Primary Examiner*—Donald E. Czaja
*Assistant Examiner*—Choon P. Koh
*Attorney, Agent, or Firm*—Watson Cole Stevens Davis, P.L.L.C.

[57] ABSTRACT

Disclosed is an animal feed manufacturing method in which powdered fish oil of a main raw material is obtained by processing fishes containing a large amount of docosa hexaenoic acid (DHA) and eicosa pentaenoic acid (EPA). The animal feed manufacturing method includes the steps of adding urea to fish oil together with a monosodium glutamate (MSG) by-product and fermenting the fish oil, separately removing water and phospolipid contained in the fermented fish oil, adding quicklime to the separated fish oil and cooling the quicklime-added fish oil via gumming and salting-out processes, and thereby obtaining powdered animal feed using a cooling roller or presser.

7 Claims, No Drawings

ANIMAL FEED MANUFACTURING METHOD BASED ON FISH OIL

BACKGROUND OF THE INVENTION

The present invention relates to a method for manufacturing animal feed made out of fish oil as a main raw material, and more particularly to an animal feed manufacturing method in which powdered fish oil of a main raw material is obtained by processing fishes containing docosa hexaenoic acid (DHA) and eicosa pentaenoic acid (EPA).

The fish oil has not been yet used as animal feed, and has been hardened only as a use for edible margarine or soap. One of main reasons that the fish oil is not used as animal feed resides in odor of the fish oil. That is, the smell of the fish oil is not easily removed. Also, since the fish oil is apt to go bad, a particular processing needs to use the fish oil as animal feed. Further, the fish oil itself cannot be used as animal feed in view of digestion of ruminant animals, such as an ox and a milch cow.

The applicant filed a Korean patent application entitled "a deodorization processing method of fish oil using a mono sodium glutamate (MSG) by-product" as a method for removing fish smell, which was published as patent publication number 93-779 on Feb. 4, 1993.

In the deodorization processing method of the above Korean patent publication, the MSG by-product is mixed to the fish oil together with water in order to remove phospholipid which is a main cause of fish smell contained in the fish oil. Then, the mixed resultant is heated. As a result, oil-soluble phospholipid of the fish oil is transposed into water-soluble phospholipid by means of water soluble protein in the MSG and the transposed water-soluble phospholipid is separated from the fish oil by a separation method, thereby floating its fat to an upper portion of the pure fish oil. Then, if the floated fat is removed, the phospholipid contained in the fish oil is effectively and perfectly eradicated. The fish oil from which the phospholipid is removed is pre-heated at the atmosphere of vacuum. The smell of the fish oil is removed by water evaporation at the atmosphere of vacuum, to eliminate unsaturated fatty acid. Then, the unsaturated fatty acid removed fish oil is cooled at the atmosphere of vacuum to complete a separation process. Thereafter, since a peroxide value (POV) is not more than 10 milimol per kilogram (mM/Kg) even though about three weeks elapse, the bad smell is not generated. Accordingly, the reduction of the fish oil, that is, the degeneration of the fish oil does not happen so that a good quality of the fish oil can be obtained.

As described above, since the MSG by-product is added to the fish oil to remove the phospholipid, and then the pre-heating, the deodorization and the cooling processes at the atmosphere of vacuum lower the degree of degeneration, the deodorization of the smell of the fish oil can be perfectly accomplished at an extremely low cost and through a simple process. Also, the low POV can be maintained for a long time, the fish oil can be kept for a long time.

SUMMARY OF THE INVENTION

Therefore, based on the above-described patent which solves deodorization and degeneration of fish oil which cannot be used as animal feed so far, it is an object of the present invention to provide a method for manufacturing animal feed obtained by powdering the fish oil to be mixed with other feed.

It is also another object of the present invention to provide a method for manufacturing animal feed by using fish oil as a main raw material in which a new processing step of powdering the fish oil is added to a step of producing the fish oil by "a fish oil deodorization method using an MSG by-product" which removes the bad smell of the fish oil and prevents the degeneration thereof.

A particular object of the present invention is to provide animal feed manufacturing method, which uses a main raw material of fish oil obtained by processing fishes containing a large amount of docosa hexaenoic acid (DHA) and eicosa pentaenoic acid (EPA).

Here, the DHA and EPA are unsaturated fatty acids contained in fish oil, that is, fish oil gained by processing sea fishes, such as a sardine, tuna, mackerel, mackerel pike, eel and cuttle fish, in which the EPA contains 10–16% unsaturated fatty acid and the DHA contains 5–10% of unsaturated fatty acid. It is known that the EPA prevents solidification of blood to block a rise of blood pressure, smooths a flow of the blood and suppresses a cholesterol value. It is also known that the DHA has not only the functions of the EPA but also further effects that activates the function of brain to increase the retentive faculty, improves retina reflex to suppress lowering of vision, decreases blood sugar to prevent diabetes, and functions anti-allergy and anti-fever.

To accomplish the above objects of the present invention, there is provided an animal feed manufacturing method based on fish oil according to the present invention, comprising the steps of:

mixing fish oil with water and a monosodium glutamate (MSG) by-product to heat and stir the mixture in a stirrer;

adding urea as a catalyst thereto when the temperature of the mixture becomes at least 30° C., heating the urea-added mixture while being stirred, and fermenting the heated mixture with steams;

separately eradicating the water and phospolipid from the fermented fish oil; and powdering the fish oil by adding quicklime to the separated fish oil, cooling the quicklime-added fish oil via gumming and salting-out processes; and mixing the powdered quicklime-added fish oil with animal feed.

DETAILED DESCRIPTION OF THE PREFERRED EMBODIMENT

A preferred embodiment of the present invention will be described below in more detail.

At the first step, fish oil of 100 weight percents is mixed with water of 40–60 weight percents and a mono sodium glutamate (MSG) by-product of 10–20 weight percents in a stirrer, by heating and stirring the mixture while slowly increasing temperature. The urea is not added as a catalyst as many as 1.5–2.0 weight percents with respect to the fish oil of 100 weight percents until the temperature of the mixture becomes at least 30° C. Thereafter, the mixture is continuously heated while being stirred, and is fermented with steams while being stirred. Typically, the urea-added mixture is heated for at least 30 minutes, preferably about one hour, at a temperature of 90°–95° C. in the step of fermenting the fish oil. Here, the added urea plays a role of a catalyst for expediting a step that the water-soluble protein of the MSG and the oil-soluble phospholipid contained in the fish oil are reacted with each other and fermented, thereby transposing an oil-soluble phospolipid of the fish oil into a water-soluble one.

At the second step, the water and the phospolipid contained in the fish oil are separately eradicated using a centrifugal machine from the fermented fish oil, thereby obtaining completely deodorized and purified fish oil.

At the third step, the fish oil obtained through the first and second steps is powdered. The water of 50 weight percents and quicklime of 10–20 weight percents are added to the fish oil of 100 weight percents, and the added mixture is gummed and salted out, and then cooled again. Thereafter, the cooled mixture is powdered via a presser or cooling roller, thereby obtaining the powdered feed which is made out of the fish oil as a main raw material.

A sardine, tuna, mackerel, mackerel pike, eel and cuttle fish are known as fishes which contain a large amount of the DHA and EPA. Particularly, since the sardine contains the EPA of about 10.5% and the DHA of about 13%, fish oil obtained from the sardine is most suitable for animal feed.

The feed of the present invention, that is, the powdered feed made out of the fish oil, which contains a large amount of the EPA and DHA can be mixed with other feed to foster livestocks such as chickens, pigs and milch cows. In spite of the known fact that the cholesterol contained in eggs leads to a main cause of adult diseases, eggs gained from the hens which are fed with this feed of the present invention contain the EPA, which lowers the cholesterol values. Also, if the chickens and pigs are fed by the feed mixed with this feed, the meat of the chickens and porks are transposed by the contained EPA and DHA. As a result, such chickens and pigs can be safely supplied to a patient suffering from German measles to which the chickens and pigs are put under taboo.

Furthermore, if the feed of the present invention are fed for milch cows, milk obtained from the milch cows contains DHA, which ensures children to have sound body and good intelligence due to activation of a brain function.

As described above, the powdered feed made out of the fish oil, which contains the DHA and EPA, is mixed with other feed at a proper ratio. If the mixed feed is fed for the livestocks and meats obtained therefrom are nourished, it is expected that various adult diseases can be greatly prevented.

While only certain embodiments of the invention have been specifically described herein, it will apparent that numerous modifications may be made thereto without departing from the spirit and scope of the invention.

What is claimed is:

1. An animal feed manufacturing method based on fish oil, comprising the steps of:

mixing fish oil with water and a monosodium glutamate (MSG) by-product to heat and stir the mixture in a stirrer;

adding urea as a catalyst thereto when the temperature of the mixture becomes at least 30° C., heating the urea-added mixture while being stirred, and fermenting the heated mixture with steam to obtain fermented fish oil;

separately eradicating the water and phospholipid from the fermented fish oil; and powdering by adding quicklime to the fermented fish oil from which phospholipid has been eradicated, cooling the quicklime-added fish oil via gumming and salting-out processes; and mixing the powdered fish oil with an animal feed.

2. The animal feed manufacturing method based on fish oil as claimed in claim 1, wherein said mixture is composed of the fish oil of 100 weight percents with water of 40–60 weight percents and the MSG by-product of 10–20 weight percents.

3. The animal feed manufacturing method based on fish oil as claimed in claim 2, wherein said urea is added in a ratio of 1.5–2.0 weight percents.

4. The animal feed manufacturing method based on fish oil as claimed in claim 1, wherein said urea-added mixture is heated during at least 30 minutes at a temperature of 90° C.–95° C. in said step of fermenting the fish oil.

5. The animal feed manufacturing method based on fish oil as claimed in claim 3, wherein said quicklime is added in a ratio of 10–20 weight percents.

6. The animal feed manufacturing method based on fish oil as claimed in claim 1, wherein said urea-added mixture is heated for about one hour at a temperature of 90°–95° C. in said step of fermenting the fish oil.

7. The animal feed manufacturing method based on fish oil as claimed in claim 1, wherein the urea is added to the mixture of fish oil with water and a monosodium glutamate (MSG) by-product at the temperature of at least 30° C. and then the urea- containing mixture is further heated to a temperature of 90°–95° C. in said step of fermenting the fish oil.

* * * * *